(12) United States Patent
Wang et al.

(10) Patent No.: US 12,235,042 B2
(45) Date of Patent: Feb. 25, 2025

(54) HEATING DEVICE AND REFRIGERATOR WITH HEATING DEVICE

(71) Applicants: QINGDAO HAIER SPECIAL REFRIGERATOR CO., LTD, Shandong (CN); QINGDAO HAIER REFRIGERATOR CO., LTD., Shandong (CN); HAIER SMART HOME CO., LTD., Shandong (CN)

(72) Inventors: Haijuan Wang, Qingdao (CN); Peng Li, Qingdao (CN)

(73) Assignees: QINGDAO HAIER SPECIAL REFRIGERATOR CO., LTD, Qingdao (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 670 days.

(21) Appl. No.: 17/425,223

(22) PCT Filed: Jan. 20, 2020

(86) PCT No.: PCT/CN2020/073295
§ 371 (c)(1),
(2) Date: Jul. 22, 2021

(87) PCT Pub. No.: WO2020/156333
PCT Pub. Date: Aug. 6, 2020

(65) Prior Publication Data
US 2022/0120497 A1    Apr. 21, 2022

(30) Foreign Application Priority Data

Jan. 28, 2019 (CN) .......................... 201920157303.2

(51) Int. Cl.
*F25D 31/00* (2006.01)
*F25D 23/02* (2006.01)
(Continued)

(52) U.S. Cl.
CPC ......... *F25D 31/005* (2013.01); *F25D 23/028* (2013.01); *F25D 23/12* (2013.01);
(Continued)

(58) Field of Classification Search
CPC .... F25D 31/005; F25D 2400/02; F25D 23/12; F25D 23/028; H05B 6/62; H05B 6/50
See application file for complete search history.

(56) References Cited

U.S. PATENT DOCUMENTS 5,856,656 A  *  1/1999  Kim ..................... H05B 6/66
                                                  361/753
9,285,151 B2    3/2016  Coulter et al.
(Continued)

FOREIGN PATENT DOCUMENTS

CN    101751055 A    6/2010
CN    106403482 A    2/2017
(Continued)

OTHER PUBLICATIONS

Translated_Zhang (Year: 2018).*
(Continued)

*Primary Examiner* — Elizabeth J Martin
*Assistant Examiner* — Samba N Gaye
(74) *Attorney, Agent, or Firm* — Alston & Bird LLP (57) ABSTRACT

A heating device (100) includes a cylinder body (110) provided with a pick-and-place opening, a door body (120) configured to open and close the pick-and-place opening, an electromagnetic generating system, at least a part of which is disposed in the cylinder body (110) or accessed into the cylinder body (110), and a temperature sensing device. The
(Continued)

temperature sensing device includes a signal sensing part (171) and a processor (172), wherein the signal sensing part (171) is configured to sense specific parameters of an incident wave signal and a reflected wave signal in the cylinder body (110), and the processor (172) is configured to judge whether an average temperature of the object to be processed is in a specific temperature interval according to the specific parameters. A more accurate overall average temperature can be obtained, and the heating progress of the object to be processed can be judged more accurately.

3 Claims, 6 Drawing Sheets (51) Int. Cl.
  *F25D 23/12* (2006.01)
  *H05B 6/50* (2006.01)
  *H05B 6/62* (2006.01)
(52) U.S. Cl.
  CPC .............. *H05B 6/50* (2013.01); *H05B 6/62* (2013.01); *F25D 2400/02* (2013.01)

(56) References Cited

U.S. PATENT DOCUMENTS

| | | | |
|---|---|---|---|
| 2010/0223944 A1 | 9/2010 | Tsujimoto et al. | |
| 2013/0080098 A1* | 3/2013 | Hadad ................ | H05B 6/6482 702/66 |
| 2018/0270918 A1 | 9/2018 | Kweon et al. | |

FOREIGN PATENT DOCUMENTS

| | | | | |
|---|---|---|---|---|
| CN | 207095131 U | * | 3/2018 | .............. F25D 11/02 |
| CN | 108233886 A | | 6/2018 | |
| CN | 108924982 A | | 11/2018 | |
| CN | 109000396 A | | 12/2018 | |
| CN | 109000403 A | | 12/2018 | |
| CN | 109000417 A | | 12/2018 | |
| CN | 109000419 A | | 12/2018 | |
| CN | 209893782 U | | 1/2020 | |
| CN | 209897300 U | | 1/2020 | |
| CN | 209897304 U | | 1/2020 | |
| EA | 030370 B1 | | 7/2018 | |
| EP | 3917281 A4 | | 3/2022 | |
| JP | S57-033585 A | | 2/1982 | |
| RU | 2473035 C1 | | 1/2013 | |
| WO | WO 2018/125136 A1 | | 7/2018 | |
| WO | WO 2018/223949 A1 | | 12/2018 | |

OTHER PUBLICATIONS

1st Office Action for India Patent Application No. 202137035922 dated Dec. 8, 2022 (6 pages).
2nd Office Action for Australia Patent Application No. 2020214406 dated Oct. 6, 2022 (3 pages).
3rd Office Action for EP Patent Application No. 20748826.3 dated Jan. 3, 2023 (5 pages).
Decision to Grant for Russia Patent Application No. 2021122582 dated Jul. 18, 2022 (15 pages).
International Search Report for PCT/CN2020/073295 (ISA/CN) mailed Apr. 20, 2020 (6 pages).
1st Office Action for Australia Application No. 2020214406 dated Jun. 8, 2022 (3 pages).
1st Office Action for EP Application No. 20748826.3 dated Mar. 4, 2022 (8 pages).
2nd Office Action for EP Application No. 20748826.3 dated Jul. 21, 2022 (5 pages).
1st Office Action for Russia Patent application No. 2021122582 dated Mar. 30, 2022 w/English translation (13 pages).
Supplementary European Search Report for EP Application No. 20748826.3 dated Feb. 22, 2022 (4 pages).
Search Report for Russian Patent Application No. 2021122582 dated Mar. 21, 2022 w/English translation (4 pages).

* cited by examiner

HEATING DEVICE AND REFRIGERATOR WITH HEATING DEVICE

CROSS-REFERENCE TO RELATED APPLICATIONS

The present application is a national phase entry of International Application No. PCT/CN2020/073295, filed Jan. 20, 2020, which claims priority to Chinese Patent Application No. 201920157303.2, filed Jan. 28, 2019, which are incorporated herein by reference in their entirety.

TECHNICAL FIELD

The present invention relates to kitchen appliances, and particularly relates to an electromagnetic wave heating device and a refrigerator with the heating device.

BACKGROUND ART

In the freezing process of food, the quality of the food is maintained, but the frozen food needs to be thawed before processing or eating. In order to facilitate users thawing the food, in the prior art, the food is generally thawed by an electromagnetic wave heating device.

However, due to the difference in penetration of microwaves to water and ice and absorption of water and ice to microwaves and the uneven distribution of internal substances of the food, the melted area absorbs a lot of energy, which is prone to uneven heating. If a conventional infrared sensor is still used to sense the temperature of the food, the problem of inaccurate judgment of the thawing progress is prone to occur.

SUMMARY OF THE INVENTION

In view of the above defects in the prior art, an objective of the first aspect of the present invention is to provide a heating device capable of accurately judging a heating progress.

A further objective of the first aspect of the present invention is to enable the heated food to be easy to cut.

An objective of the second aspect of the present invention is to provide a refrigerator with the heating device.

According to the first aspect of the present invention, provided is a heating device, including:
a cylinder body, provided with a pick-and-place opening;
a door body, disposed at the pick-and-place opening and configured to open and close the pick-and-place opening;
an electromagnetic generating system, at least a part of which is disposed in the cylinder body or accessed into the cylinder body, so as to generate electromagnetic waves in the cylinder body to heat an object to be processed; and
a temperature sensing device, configured to sense a temperature of the object to be processed, wherein the temperature sensing device includes:
a signal sensing part, configured to sense specific parameters of an incident wave signal and a reflected wave signal in the cylinder body; and
a signal processing part, configured to judge whether an average temperature of the object to be processed is in a specific temperature interval according to the specific parameters.

Optionally, the specific parameters are currents, voltages or powers.

Optionally, the signal processing part is configured to calculate an imaginary part change rate of a dielectric coefficient of the object to be processed according to the specific parameters, and to determine that the average temperature of the object to be processed is in the specific temperature interval when the imaginary part change rate is greater than or equal to a preset change threshold.

Optionally, the signal processing part is configured to calculate an electromagnetic wave absorption rate of the object to be processed according to the specific parameters, and to determine that the average temperature of the object to be processed is in the specific temperature interval when the electromagnetic wave absorption rate is less than or equal to a preset absorption threshold.

Optionally, the electromagnetic generating system includes:
an electromagnetic generating module, configured to generate an electromagnetic wave signal; and
a radiating assembly, including one or more radiating units, which are configured to be electrically connected with the electromagnetic generating module and at least a part of which is disposed in the cylinder body or accessed into the cylinder body, so as to generate electromagnetic waves of a corresponding frequency according to the electromagnetic wave signal.

Optionally, the signal sensing part is connected in series between the electromagnetic generating module and the radiating assembly to acquire the specific parameters of the incident wave signal and the reflected wave signal, wherein
the radiating assembly serves as a signal receiving part of the temperature sensing device to receive the reflected wave signal.

Optionally, the specific temperature interval is −5° C. to −1° C.

Optionally, the electromagnetic generating system is configured to stop working when the temperature sensing device determines that the average temperature of the object to be processed is in the specific temperature interval.

Optionally, the signal sensing part and the signal processing part are integrated on a circuit board, and the circuit board is configured to be grounded.

According to the second aspect of the present invention, provided is a refrigerator, including:
a cabinet, defining at least one storage compartment; and
at least one cabinet door, configured to open and close the at least one storage compartment, wherein the refrigerator further includes:
any one of the above heating devices, disposed in one of the storage compartments.

The temperature sensing device of the present invention may not be accurate in sensing a single temperature point value, and there are certain difficulties. However, the inventor of the present application creatively found that the temperature sensing device may be used to judge whether the overall average temperature of the object to be processed is in a specific temperature interval. Compared with sensing surface temperatures of different areas of the object to be processed by a plurality of sensors in the prior art, a more accurate overall average temperature can be obtained, and then the heating progress of the object to be processed can be judged more accurately.

Further, in the present invention, the electromagnetic generating system is configured to stop working when the temperature sensing device determines that the average temperature of the object to be processed is between −5° C. and −1° C., so that when the object to be processed is meat, not only the heated object to be processed can be prevented from producing bloody water, but also the object to be processed can be made to have a suitable shear strength and be easy to cut.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
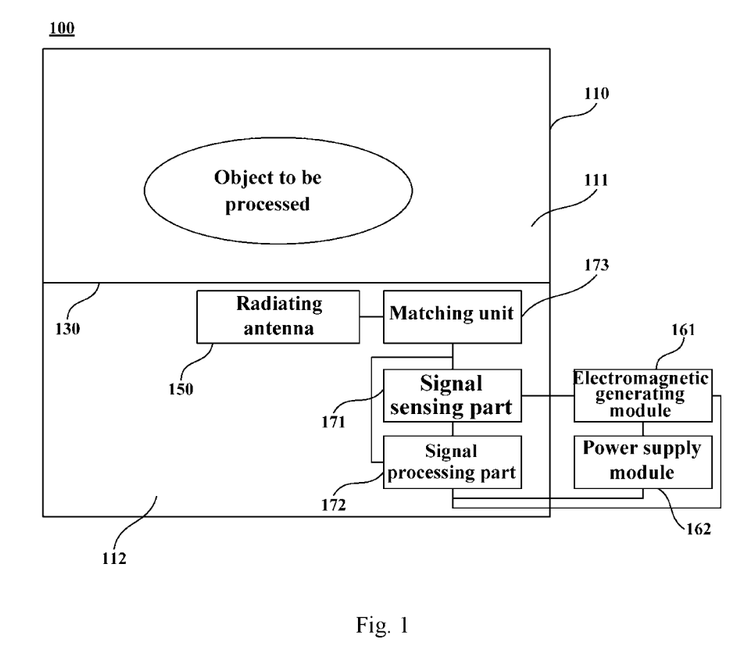
FIG. 1 is a schematic structural diagram of a heating device according to one embodiment of the present invention.
Figure 2:
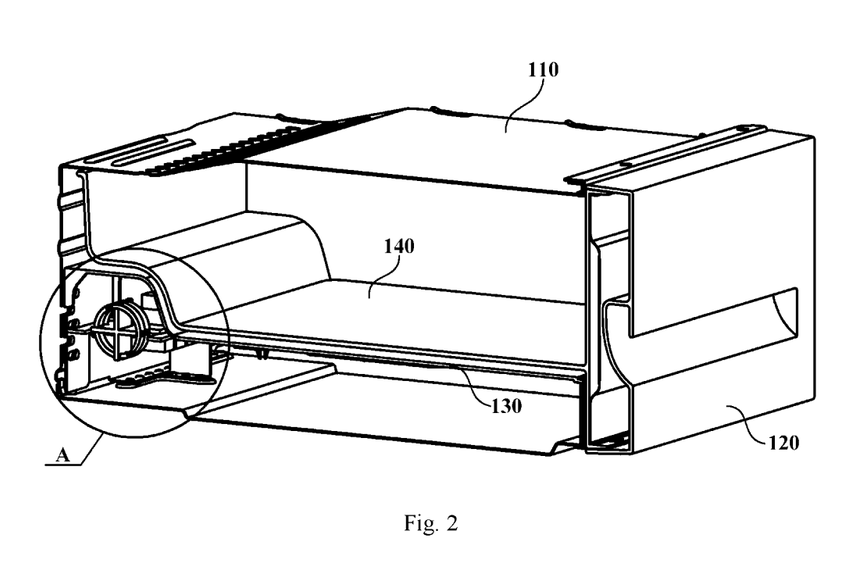
FIG. 2 is a schematic sectional view of the heating device as shown in FIG. 1, wherein an electromagnetic generating module and a power supply module are removed.

FIG. 1 is a schematic structural diagram of a heating device 100 according to one embodiment of the present invention. FIG. 2 is a schematic sectional view of the heating device 100 as shown in FIG. 1, wherein an electromagnetic generating module 161 and a power supply module 162 are removed. Referring to FIG. 1 and FIG. 2, the heating device 100 may include a cylinder body 110, a door body 120 and an electromagnetic wave generating system.

The cylinder body 110 may be configured to place an object to be processed, and a front wall or a top wall thereof may be provided with a pick-and-place opening for picking and placing the object to be processed.

The door body 120 may be installed together with the cylinder body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the cylinder body 110 by sliding rails.

In some embodiments, the electromagnetic wave generating system may include an electromagnetic generating module 161, a power supply module 162 and a radiating assembly.

The power supply module 162 may be configured to be electrically connected with the electromagnetic generating module 161 to provide electric energy to the electromagnetic generating module 161, so that the electromagnetic generating module 161 generates electromagnetic wave signals. The radiating assembly may include one or more radiating units disposed in the cylinder body 110 or accessed into the cylinder body 110, and the one or more radiating units are electrically connected with the electromagnetic generating module 161 to generate electromagnetic waves of corresponding frequencies according to the electromagnetic wave signals, so as to heat the object to be processed in the cylinder body 110. In some embodiments, the number of the radiating units may be one, and the radiating unit is a flat plate type radiating antenna 150.

The cylinder body 110 and the door body 120 may be respectively provided with electromagnetic shielding features, so that the door body 120 is conductively connected with the cylinder body 110 when the door body is in a closed state, so as to prevent electromagnetic leakage.

In some embodiments, the cylinder body 110 may be made of metals to serve as a receiving pole to receive electromagnetic waves generated by the radiating antenna 150. In some other embodiments, a side wall of the cylinder body 110 opposite to the radiating antenna 150 may be provided with a receiving pole plate to receive the electromagnetic waves generated by the radiating antenna 150.

Figure 3:
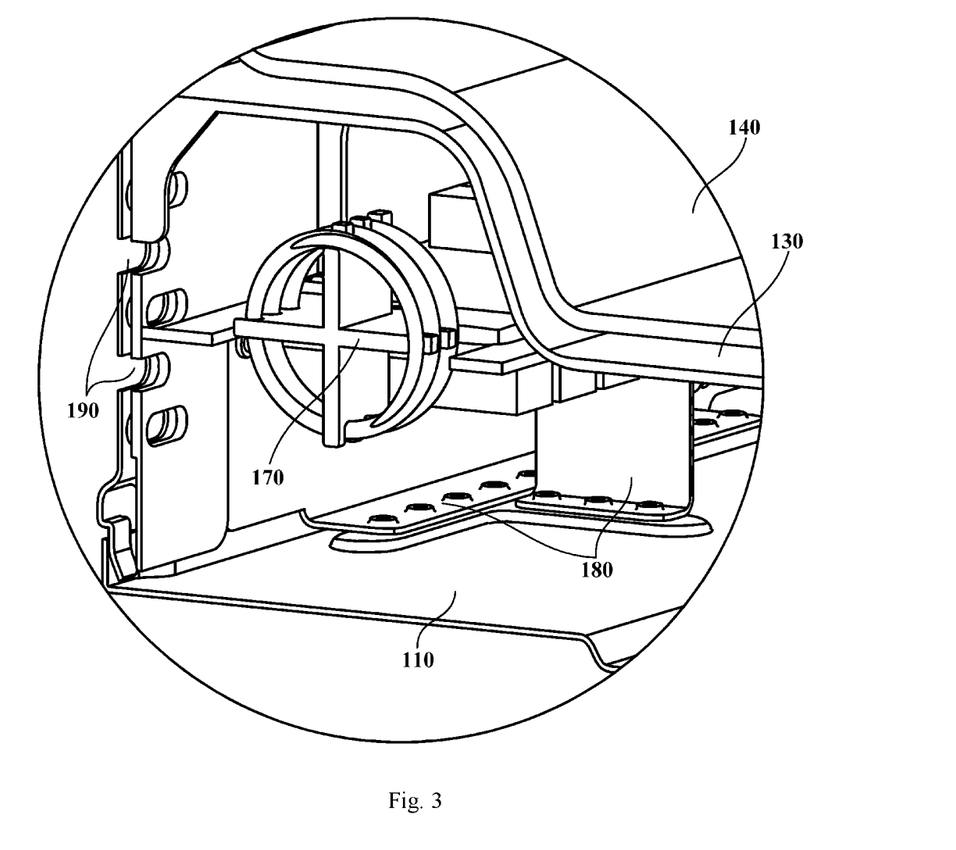
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a temperature sensing device configured to sense the temperature of an object to be processed. Specifically, the temperature sensing device may include a signal sensing part 171 and a signal processing part 172.

The signal sensing part 171 may be configured to sense the specific parameters of incident wave signals and reflected wave signals in the cylinder body 110. In some embodiments, the signal sensing part 171 may be connected in series between the electromagnetic generating module 161 and the radiating antenna 150, and detect in real time the incident wave signals and the reflected wave signals passing through the signal sensing part, wherein the radiating antenna 150 may serve as a signal receiving part of the temperature sensing device to receive the reflected wave signals.

The signal processing part 172 may be configured to acquire the specific parameters from the signal sensing part 171, and calculate the power of the incident wave signals and reflected wave signals according to the specific parameters. In the present invention, the specific parameters may be voltage values and/or current values. Alternatively, the signal sensing part 171 may be a power meter to directly measure the power of the incident wave signals and reflected wave signals.

The signal processing part 172 may be configured to judge whether the average temperature of the object to be processed is in a specific temperature interval according to the power of the incident wave signals and reflected wave signals.

In some embodiments, the signal processing part 172 may be further configured to calculate an imaginary part change rate of a dielectric coefficient of the object to be processed according to the power of the incident wave signals and reflected wave signals and compare the imaginary part change rate with a preset change threshold, and determine that the average temperature of the object to be processed is in the specific temperature interval when the imaginary part change rate is greater than or equal to the preset change threshold. The calculation formulas of the imaginary part of the dielectric coefficient are as follows:

$$p = 2\varepsilon_0 \varepsilon'' \pi f E^2$$

$$P(t_i) = P_{in}(t_i) - P_{refl}(t_i)$$

In the above formulas, P represents power of electromagnetic waves absorbed by an object to be processed; $\varepsilon_0$ represents a vacuum dielectric coefficient; $\varepsilon''$ represents an imaginary part of a dielectric coefficient of the object to be processed; f represents frequency of electromagnetic waves; E represents electric field intensity in the cylinder body; $p(t_i)$ represents power of electromagnetic waves absorbed by the object to be processed at the time $t_i$; $P_{in}(t_i)$ represents power of incident waves at the time $t_i$; and $P_{refl}(t_i)$ represents power of reflected waves at the time $t_i$.

In some other embodiments, the signal processing part 172 may be further configured to calculate an electromagnetic wave absorption rate (the ratio of the power of the absorbed electromagnetic waves to the power of the incident waves) of the object to be processed according to the power of the incident wave signals and reflected wave signals and compare the electromagnetic wave absorption rate with a preset absorption threshold, and determine that the average temperature of the object to be processed is in the specific temperature interval when the electromagnetic wave absorption rate is less than or equal to the preset absorption threshold.

When the heating device 100 is used for thawing, the specific temperature interval may be −5° C. to −1° C. The electromagnetic generating module 161 may be configured to stop working when the temperature sensing device determines that the average temperature of the object to be processed is in the specific temperature interval (i.e., −5° C. to −1° C.) so as to prevent the heated object to be processed from producing thawed water, and make the object to be processed have a suitable shear strength and easy to cut.

The heating device 100 may further include a matching unit 173. The matching unit 173 may be connected in series between the electromagnetic generating module 161 and the radiating antenna 150, and is configured to adjust a load impedance of the electromagnetic generating module 161, so as to improve the matching degree between the output impedance and the load impedance of the electromagnetic generating module 161, so that when foods with different fixed attributes (such as type, weight and volume) are placed in a heating chamber 111, or during the temperature change of the foods, relatively more electromagnetic wave energy is radiated in the heating chamber 111, thereby increasing the heating rate.

The signal processing part 172 may be further configured to send an adjusting command to the matching unit 173 when the electromagnetic wave absorption rate is less than a preset matching threshold. The preset matching threshold may be 60% to 80%, such as 60%, 70% or 80%.

In some embodiments, the signal sensing part 171, the signal processing part 172 and the matching unit 173 may be integrated on a circuit board 170, so as to facilitate the installation and maintenance of the signal sensing part 171, the signal processing part 172 and the matching unit 173.

The circuit board 170 may be disposed at the rear lower part inside the cylinder body 110, which not only can make the cylinder body 110 have a relatively large storage space, but also can avoid the damage to the circuit board 170 due to excessively high food placed in the drawer 140. The rear part of the bottom wall of the drawer 140 may be configured to be recessed upward to form an enlarged space below the drawer.

Figure 4:
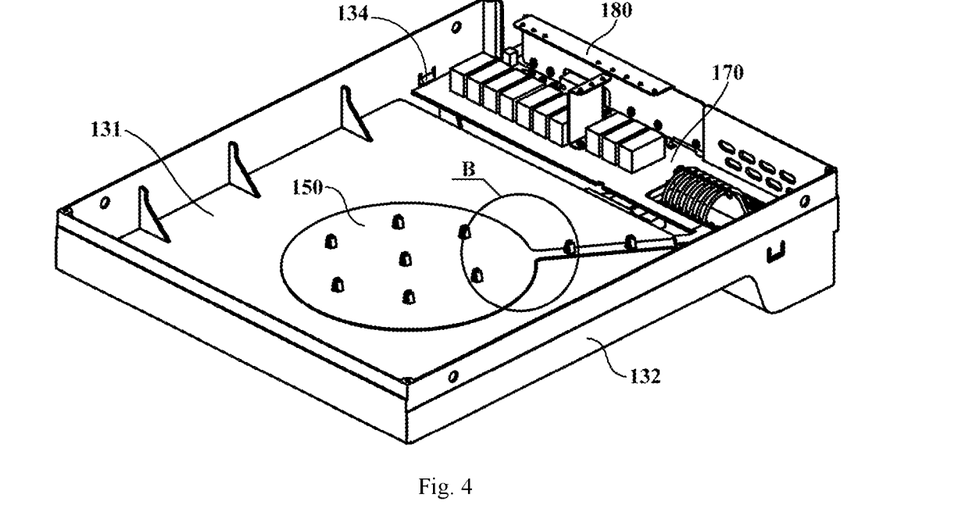
FIG. 4 is a schematic structural diagram of an electrical appliance chamber according to one embodiment of the present invention.

FIG. 4 is a schematic structural diagram of an electrical appliance chamber 112 according to one embodiment of the present invention. Referring to FIG. 2 and FIG. 4, the heating device 100 may further include a housing 130 to separate the inner space of the cylinder body 110 into a heating chamber 111 and an electrical appliance chamber 112. The object to be processed and the circuit board 170 may be respectively disposed in the heating chamber 111 and the electrical appliance chamber 112 to separate the object to be processed from the circuit board 170, so as to prevent the circuit board 170 from being damaged by accidental touch.

Specifically, the housing 130 may include a clapboard 131 for separating the heating chamber 111 and the electrical appliance chamber 112, and a skirt part 132 fixedly connected with the inner wall of the cylinder body 110.

In some embodiments, the circuit board 170 may be horizontally disposed. A clamping tongue 134 extending upward and inward may be respectively formed on two lateral side walls of the housing 130, and the circuit board 170 may be clamped above the two clamping tongues 134.

The housing 130 and the cylinder body 110 may be provided with heat dissipation holes 190 respectively in positions corresponding to the matching unit 173, so that the heat generated by the matching unit 173 during working is discharged through the heat dissipation holes 190.

In some embodiments, the radiating antenna 150 may be disposed in the electrical appliance chamber 112 to prevent the radiating antenna 150 from being dirty or damaged by accidental touch.

The housing 130 may be made of an insulating material, so that the electromagnetic waves generated by the radiating antenna 150 can pass through the housing 130 to heat the object to be processed. Further, the housing 130 may be made of a non-transparent material to reduce the electromagnetic loss of the electromagnetic waves at the housing 130, thereby increasing the heating rate of the object to be processed. The above-mentioned non-transparent material is a translucent material or an opaque material. The non-transparent material may be a PP material, a PC material or an ABS material, etc.

The housing 130 may also be configured to fix the radiating antenna 150 to simplify the assembly process of the heating device 100 and facilitate the positioning and installation of the radiating antenna 150, wherein the radiating antenna 150 may be configured to be fixedly connected with the clapboard 131.

Figure 5:
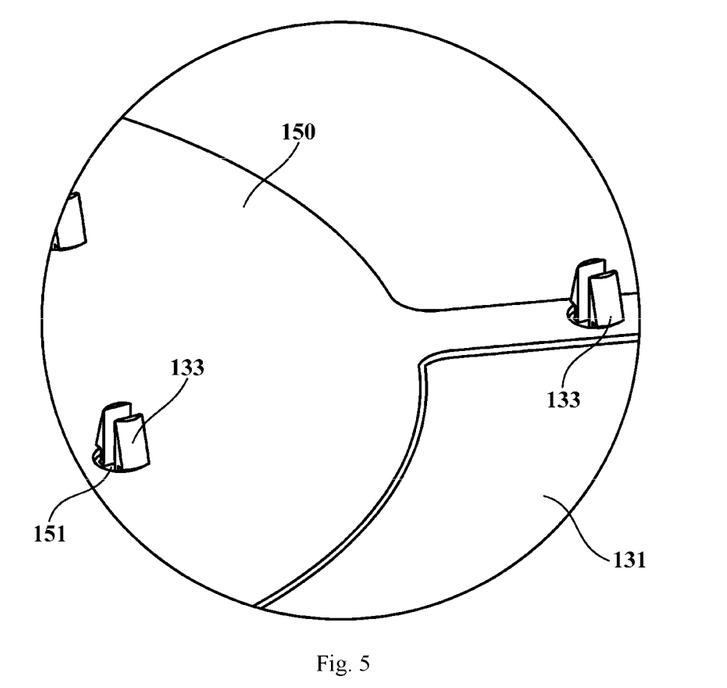
FIG. 5 is a schematic enlarged view of a region B in FIG. 4.

In some embodiments, the radiating antenna 150 may be configured to be engaged with the housing 130. FIG. 5 is a schematic enlarged view of a region B in FIG. 4. Referring to FIG. 5, the radiating antenna 150 may be provided with a plurality of engaging holes 151; the housing 130 may be correspondingly provided with a plurality of buckles 133, and the plurality of buckles 133 are configured to respectively pass through the plurality of engaging holes 151 to be engaged with the radiating antenna 150.

In one embodiment of the present invention, each of the buckles 133 may be composed of two baths disposed at an interval and in mirror symmetry.

Figure 6:
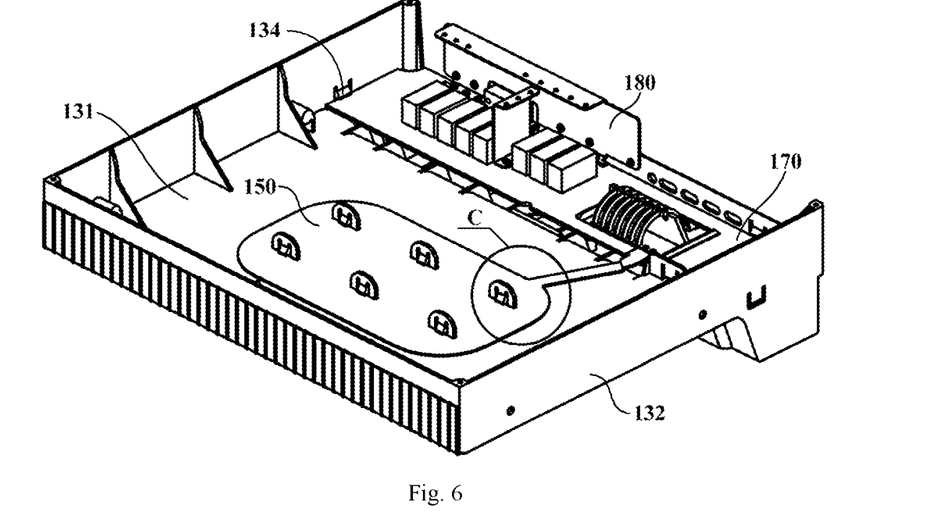
FIG. 6 is a schematic structural diagram of an electrical appliance chamber according to another embodiment of the present invention.
Figure 7:
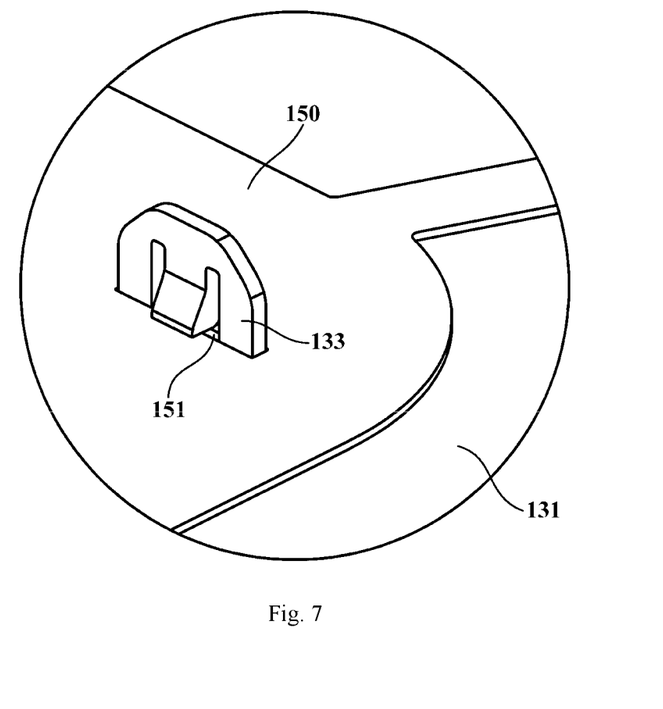
FIG. 7 is a schematic enlarged view of a region C in FIG. 6.

FIG. 6 is a schematic structural diagram of an electrical appliance chamber 112 according to another embodiment of the present invention. FIG. 7 is a schematic enlarged view of a region C in FIG. 6. Referring to FIG. 6 and FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the housing 130 by an electroplating process.

The housing 130 may further include a plurality of reinforcing ribs, and the reinforcing ribs are configured to connect the clapboard 131 and the skirt part 132 so as to improve the structural strength of the housing 130.

In some embodiments, the radiating antenna 150 may be horizontally disposed at the height of ⅓ to ½, such as ⅓, ⅖ or ½, of the cylinder body 110, so that the volume of the heating chamber 111 is relatively large, and meanwhile, the electromagnetic waves in the heating chamber 111 have a relatively high energy density so as to make the object to be processed heated quickly.

Referring to FIG. 4 and FIG. 6, the peripheral edge of the radiating antenna 150 may be formed by smooth curves, so as to make the distribution of electromagnetic waves in the cylinder body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

In some embodiments, the metal cylinder body 110 may be configured to be grounded to discharge the electric charges thereon, thereby improving the safety of the heating device 100.

The heating device 100 may further include a metal bracket 180. The metal bracket 180 may be configured to connect the circuit board 170 and the cylinder body 110 to support the circuit board 170 and discharge the electric charges on the circuit board 170 through the cylinder body 110. In some embodiments, the metal bracket 180 may be composed of two parts perpendicular to each other. The metal bracket 180 may be fixedly connected with the housing 130 to facilitate the connection of the housing 130 and the metal bracket 180 with the cylinder body 110.

Figure 8:
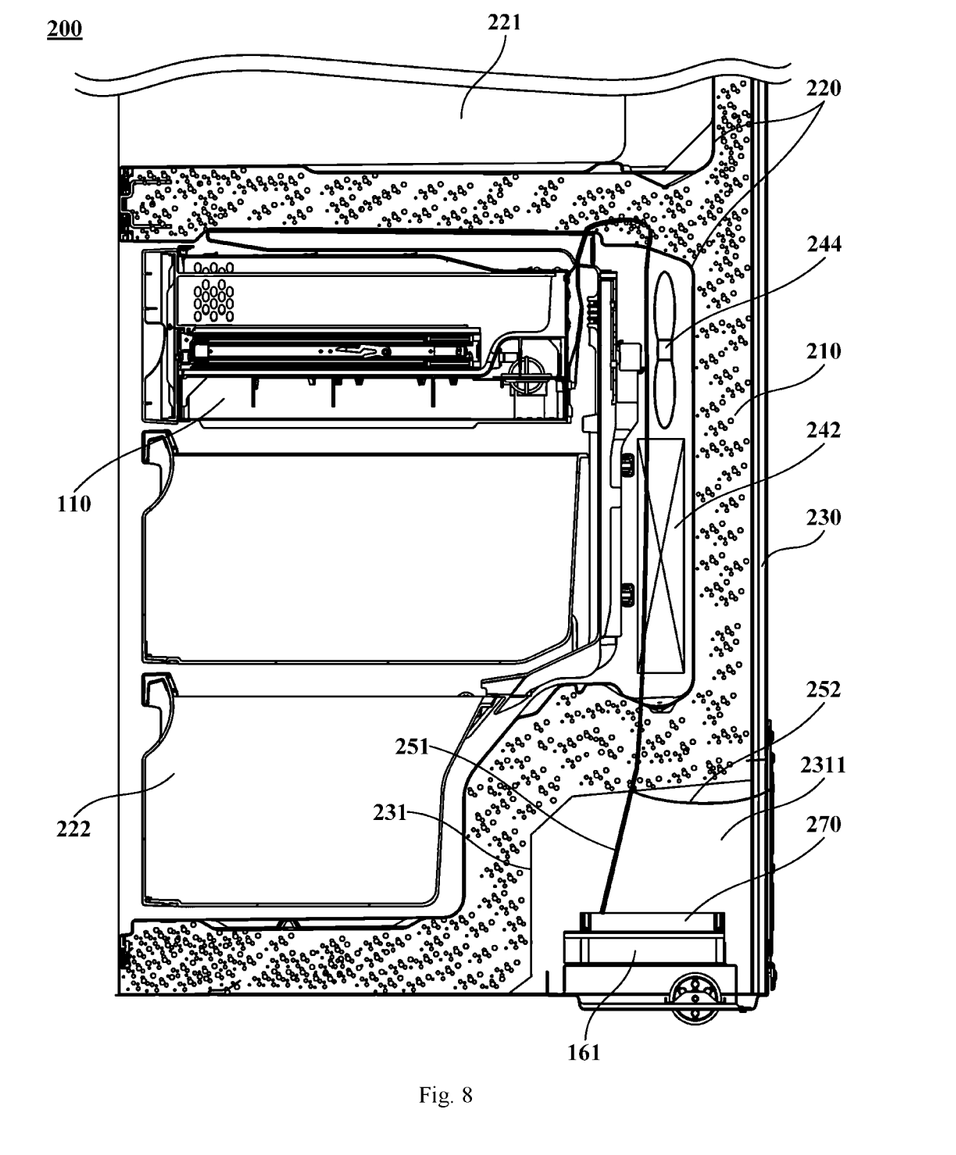
FIG. 8 is a schematic structural diagram of a refrigerator according to one embodiment of the present invention.

Based on the heating device 100 according to any one of the above embodiments, the present invention may further provide a refrigerator 200. FIG. 8 is a schematic structural diagram of a refrigerator 200 according to one embodiment of the present invention. Referring to FIG. 8, the refrigerator 200 may include a cabinet defining at least one storage compartment, at least one cabinet door configured to respectively open and close the at least one storage compartment, and a refrigerating system configured to provide cooling capacity to the at least one storage compartment. The cylinder body of the heating device 100 may be disposed in one storage compartment.

In the present invention, at least one means one, two, or more than two. The power supply module 162 of the heating device 100 may be powered by a main control board of the refrigerator 200, and the signal processing part 172 and the main control board of the refrigerator 200 may be independent of each other without information interaction.

In an illustrated embodiment, there are two storage compartments, namely a refrigerating compartment 221 and a freezing compartment 222 disposed under the refrigerating compartment 221. The cylinder body of the heating device 100 is disposed in the freezing compartment 222.

The refrigerating system may include a compressor, a condenser, an evaporator 242, a refrigerating fan 244 for blowing the cooling capacity generated by the evaporator 242 into the freezing compartment 222, and a heat dissipation fan for heat dissipation of the condenser.

The cabinet may include an inner liner 220, a shell 230 and an insulating layer 210 disposed between the inner liner 220 and the shell 230. The shell 230 may include two side panels respectively located on two lateral sides of the insulating layer 210, bottom steel 231 located at the bottom of the insulating layer 210, and a back plate located at the rear of the insulating layer 210.

The refrigerator 200 further includes a power line (not shown in the figure) for receiving commercial power, so as to supply power to the heating device 100 and the refrigerating system. The power line may include a grounding wire which is connected with a ground wire of the commercial power and is conductively connected with the bottom steel 231, so as to prevent the electric leakage of the refrigerator 200.

The bottom steel 231 defines a compressor chamber 2311 for placing the compressor. The electromagnetic generating module 161 may be disposed in the compressor chamber 2311, and the top of the electromagnetic generating module is thermally connected with a heat dissipation fin 270, so as to improve the heat dissipation efficiency of the electromagnetic generating module 161.

The cylinder body 110 may be conductively connected with the bottom steel 231 through a lead wire 252 to guide the electric charges thereon to the bottom steel 231 so as to avoid potential safety hazards A signal transmission wire 251 and the lead wire 252 of the signal sensing part 171 (or the matching unit 173) and the signal processing part 172 may be disposed in the insulating layer 210 in advance, and pass through the inner liner 220 and the bottom steel 231 to reserve a wiring terminal in the compressor chamber 2311, so that the signal transmission wire 251 and the lead wire 252 may be routed together so as to save the assembly cost.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A heating device, comprising:
   a cylinder body, provided with a pick-and-place opening;
   a door body, disposed at the pick-and-place opening and configured to open and close the pick-and-place opening;
   an electromagnetic generating system comprising an electromagnetic generator and one or more radiating units, at least a part of the electromagnetic generating system being disposed in the cylinder body or accessed into the cylinder body, so as to generate electromagnetic waves in the cylinder body to heat an object to be processed; and
   a temperature sensing device, configured to sense specific parameters of an incident wave signal and a reflected wave signal in the cylinder body, to calculate an electromagnetic wave absorption rate of the object to be processed according to the specific parameters, and to determine that an average temperature of the object to be processed is in a specific temperature interval being −5° C. to −1° C. when the electromagnetic wave absorption rate is less than or equal to a preset absorption threshold, wherein the temperature sensing device is integrated on a circuit board, and the circuit board is configured to be grounded;

and wherein the electromagnetic generating system is configured to stop working when the temperature sensing device determines that the average temperature of the object to be processed is in the specific temperature interval.

2. The heating device according to claim 1, wherein the specific parameters are currents, voltages or powers.

3. A refrigerator, comprising:
a cabinet, defining at least one storage compartment; and
at least one cabinet door, configured to open and close the at least one storage compartment, wherein the refrigerator further comprises:
the heating device according to claim 1, disposed in one of the at least one storage compartment.

* * * * *

UNITED STATES PATENT AND TRADEMARK OFFICE
CERTIFICATE OF CORRECTION

Page 1 of 1

PATENT NO. : 12,235,042 B2
APPLICATION NO. : 17/425223
DATED : February 25, 2025
INVENTOR(S) : Haijuan Wang et al.

It is certified that error appears in the above-identified patent and that said Letters Patent is hereby corrected as shown below:

On the Title Page

Item (71), Applicants, Line 3, delete "Shandong" and insert -- Qingdao --, therefor.

Item (71), Applicants, Line 5, delete "Shandong" and insert -- Qingdao --, therefor.

Item (71), Applicants, Line 6, delete "Shandong" and insert -- Qingdao --, therefor.

Signed and Sealed this
Third Day of June, 2025

Coke Morgan Stewart
*Acting Director of the United States Patent and Trademark Office*